Sept. 18, 1934.   F. DENIG   1,973,892
MANUFACTURE OF AMMONIUM SULPHATE
Filed Jan. 13, 1932   2 Sheets-Sheet 1
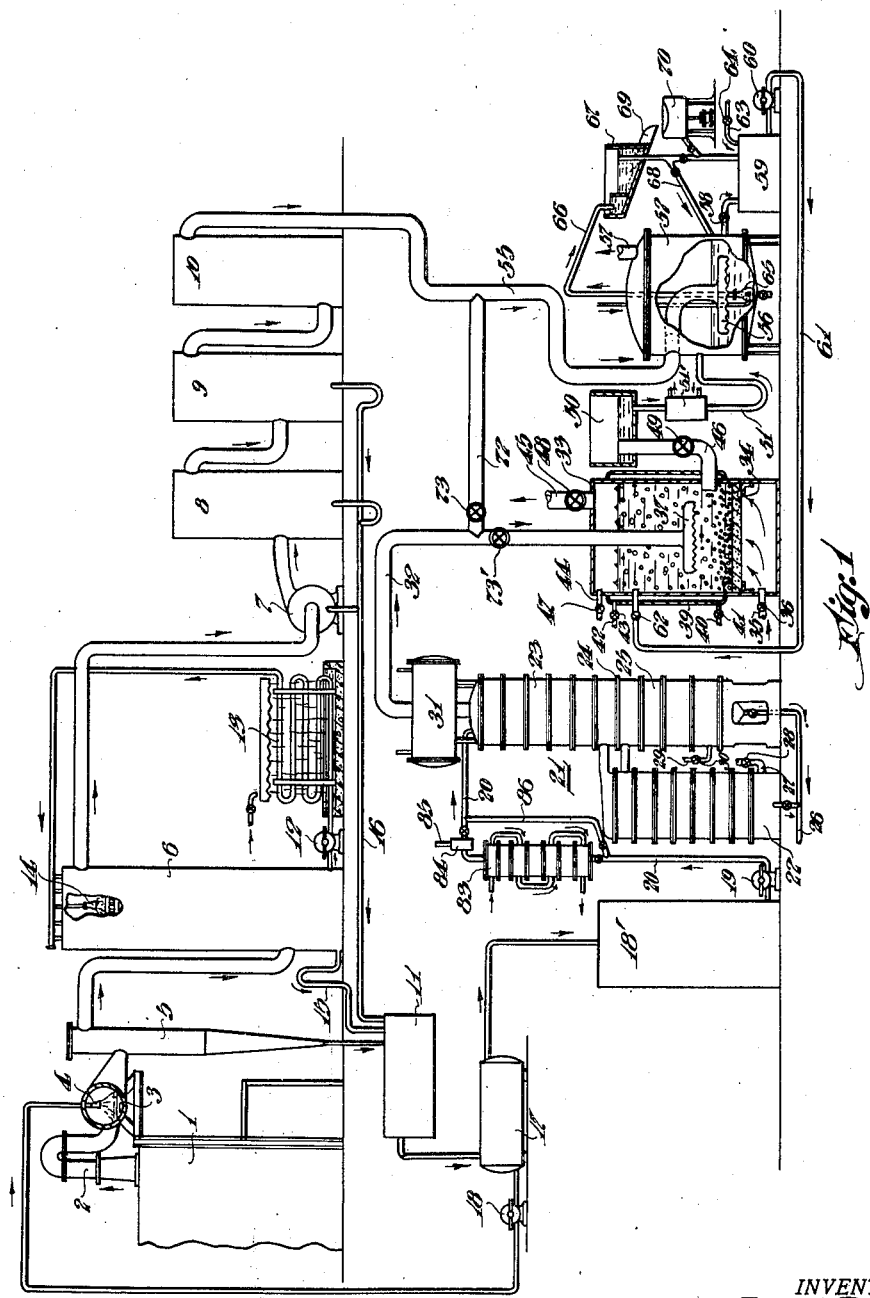
INVENTOR.
Fred Denig
BY
Jesse R. Langley
ATTORNEY.

Sept. 18, 1934.  F. DENIG  1,973,892
MANUFACTURE OF AMMONIUM SULPHATE
Filed Jan. 13, 1932   2 Sheets-Sheet 2
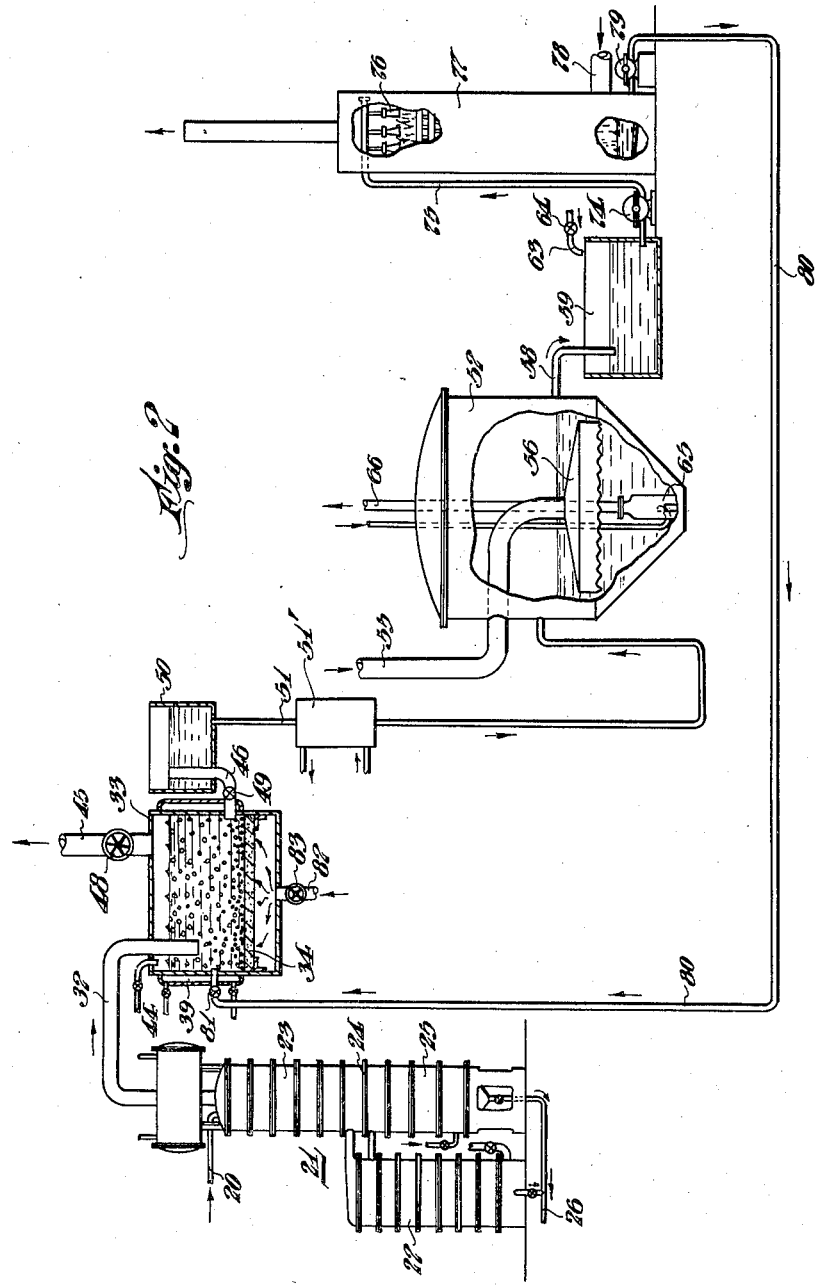
INVENTOR.
Fred Denig.
BY
Jesse R. Langley
ATTORNEY.

Patented Sept. 18, 1934

1,973,892

UNITED STATES PATENT OFFICE 1,973,892

MANUFACTURE OF AMMONIUM SULPHATE

Fred Denig, Pittsburgh, Pa., assignor to The Koppers Company of Delaware, a corporation of Delaware Application January 13, 1932, Serial No. 586,322

11 Claims. (Cl. 23—119)

This invention relates to the manufacture of ammonium sulphate and more particularly to the utilization of ammonia obtained from industrial gases, for the production of ammonium sulphate.

In the operation of by-product coke-oven plants, for instance, coal gases obtained by the distillation of coal are treated at various stages to remove ammonia therefrom. The gases from the ovens are cooled and scrubbed with an aqueous medium in towers usually known as primary coolers.

The gases coming from the primary coolers still contain ammonia, and after passing the gases through tar extractors and possibly cyanide removers the gases are further treated to remove the remaining portion of ammonia. The condensates in the primary coolers are removed in the form of an ammonia liquor. This liquor is distilled and the ammonia vapors therefrom are usually passed back into the main gas stream to be finally removed by means of an acid.

I have found that by properly proportioning the amount of ammonia removed from the gas in the primary cooler and the amount of ammonia remaining in the gas coming from the primary coolers, the vapors from the ammonia still and the coal gas containing the unremoved ammonia may be separately utilized in a stepwise process of preparing ammonium sulphate by reacting the ammonia in the still gases with sulphur dioxide and oxygen to form ammonium bisulphate and then contacting the ammonium bisulphate with the coal gas containing the unremoved ammonia to convert the bisulphate to the less soluble normal sulphate.

In the accompanying drawings, showing for purposes of exemplification a preferred form and manner in which the invention may be embodied and practiced, Figure 1 is an elevational view partially in cross section, of apparatus employed in connection with the present process; and Fig. 2 is an elevational view partially in cross section of a modification of the arrangement shown in Fig. 1.

The apparatus shown in Fig. 1 includes various units ordinarily employed in coke oven gas manufacturing plants. Gases from a coke oven 1 pass through a stand-pipe 2 into a collecting main 3 which is provided with sprays 4 for spraying the gases with a cooling medium, such as ammonia liquor.

The condensates and collected liquid materials are separated from the gases in a downcomer 5. The gases pass into the bottom of a primary cooler 6 wherein they are contacted with an aqueous medium which is sprayed into the tower 6 at the top.

The cooled gases are withdrawn from the top of the tower 6 by means of an exhauster 7 and are pumped through tar extractors 8 and 9 and through a reheater 10.

Ammonia liquor and tar pass from the downcomer 5 into a tank or decanter 11. The liquor formed in the tower 6 is withdrawn by means of a pump 12 which pumps the liquor through a cooling coil 13 to the sprays 14 at the top of the tower 6.

The liquor is repeatedly recirculated in this manner and any surplus liquor flows out of the bottom of the tower 6 through a pipe 15 into the tank 11. Additional condensates or collected liquids from the gases are withdrawn from the exhauster 7 and the tar extractors 8 and 9 and pass to the decanter 11 through a pipe 16.

In the decanter tank 11 the tar and ammonia liquor separate into layers and the ammonia liquor passes from the decanter 11 into a circulating tank 17. A portion of this liquor is pumped by means of a pump 18 to the sprays 4 in the collecting main 3. Surplus liquor passes from the tank 17 into a collecting tank 18' from which it is pumped by means of a pump 19 through a pipe 20 into an ammonia still 21.

The ammonia still 21 is of the usual type employed for distillation of ammonia and comprises a fixed ammonia section 22, a free ammonia section 23 separated at a point 24 from a lime leg 25. Spent liquor is removed from the bottom of the still through a pipe 26. Steam for heating the liquor is introduced into the fixed section 22 through a pipe 27 provided with a valve 28 and into the lime leg through a pipe 29 provided with a valve 30.

The top of the free section of the ammonia still is provided with a dephlegmator 31 and a vapor outlet pipe 32.

Pipe 32 conducts the ammonia still gases into a chamber 33 which is provided with a porous plate 34 positioned above the bottom of the chamber, and a gas inlet pipe 35 provided with a valve 36. The end of the pipe 32 is preferably provided with a distributor 37 placed at any convenient point above the plate 34.

The chamber 33 is provided with a heating jacket 39 to which is connected an inlet pipe 40 provided with a valve 41 and an outlet pipe 42 provided with a valve 43 to permit the passage of a heating medium through the jacket 39.

Connected to the chamber 33 above the plate 34 are pipes 44, 45 and 46 provided respectively with valves 47, 48 and 49. The pipe 46 passes into a trough 50 to the bottom of which is connected a pipe 51 which leads to a gas and liquid contact apparatus 52.

The gas and liquid contact apparatus may be of any desired type and in the present instance the apparatus 52 is the usual saturator in which gases are bubbled through the liquid with which the gases are contacted. A pipe 55 leads from the reheater 10 into the saturator 52 and is provided with a distributor 56.

The saturator is provided with a gas outlet 57 and a liquid outlet 58 which is connected to a tank 59. The tank 59 is provided with an outlet which is connected to a pump 60 which pumps liquid through a pipe 61, provided with a valve 62, into the chamber 33 above the plate 34. The tank 59 is also provided with a pipe connection 63 provided with a valve 64.

Adjacent the bottom of the saturator 52 is an ejector pump 65 which forces material through a pipe 66 onto a drain table 67 which is provided with a liquor draw-off pipe 68 and a spout 69. Beneath the spout 69 is a centrifugal separator 70.

In the operation of the apparatus shown in Figure 1, the scrubbing of the coke-oven gases in the primary cooler is conducted so that preferably an amount of ammonia is withdrawn from the gases not exceeding half of the total amount of ammonia by methods well known in the art. The ammonia liquor formed is distilled in the still 21 and is brought into contact with an aqueous medium in the chamber 33.

The ammonia still gases are introduced preferably above the porous plate 34 and at the same time sulphur dioxide and air or oxygen are conducted through the pipe 35 beneath the porous plate and are forced therethrough into the aqueous medium. The operation of the still and the introduction of sulphur dioxide and oxygen are so conducted that the gases react to form ammonium bisulphate. The aqueous medium is preferably maintained in an acid condition so that hydrogen sulphide which may be present in the ammonia still gases passes through the solution and out through the pipe 45.

The aqueous medium in the chamber 33 is preferably maintained in a heated condition. Satisfactory results are obtained by employing temperatures from 80° C. up to the boiling point of the solution formed in the chamber 33. In order to prevent condensation of steam which may be present in the ammonia still gases, the temperature of the aqueous medium may be maintained at or above 100° C. By the proper manipulation of valves the pressures in the chamber 33 may be maintained above atmospheric.

Although a particular means is shown for contacting the aqueous medium with the various gases any type of contact apparatus may be employed to obtain the desired result. The sulphur dioxide and oxygen may be introduced as mixtures containing preferably about 5% to 8% by volume sulphur dioxide or they may be introduced separately. It is preferable that these gases, if bubbled through the liquid, be finely divided. For this purpose any gas comminuting means may be employed.

The ammonium bisulphate solution formed in the chamber 33 is permitted to overflow into the trough 50 from whence it passes into the saturator 52. In the saturator 52 the ammonium bisulphate solution is contacted with the coal gas containing the unremoved ammonia. The ammonia in the gas reacts with the ammonium bisulphate and forms the normal ammonium sulphate.

Ordinarily the gas passing into the saturator is heated in the reheater 10 to about 50° C. The temperature of this gas may be raised or lowered depending upon the concentration of the solution in the saturator 52. Under proper conditions the ammonium sulphate separates out in crystalline form and forms a slurry which is pumped out of the saturator onto the drain table 67.

The mother liquor returns to the saturator through the pipe 68 and the ammonium sulphate is centrifuged in the centrifugal separator 70 to remove excess moisture. Ammonium sulphate solution is withdrawn from the saturator 52 and is passed back through the pipe 61 into the chamber 33.

Provision is made for passing the liquor from the saturator 52 to the drain table 67 and then directly to the tank 59 instead of back to the saturator. In this case preferably no liquor is withdrawn through the pipe 58. The liquid from the centrifuge 70 may also be passed to the tank 59.

The volume of the aqueous medium in the apparatus in which the reactions are caried on, and in the connecting pipes is preferably maintained substantially constant. Additional aqueous medium may be introduced into the system through the pipes 44 or 63. The temperature of the chamber 33 and of the gases which are passed into the saturator 52 may be controlled to produce a certain amount of evaporation.

The rate of flow of the aqueous medium through the system may be controlled so that the ammonia from the ammonia still gases is substantially entirely used up in the formation of ammonium bisulphate and the ammonia in the coal gases is substantially used up in the formation of sulphate.

Alternatively, some of the ammonia still gases may be passed from the pipe 32 into the pipe 55 through a pipe 72 provided with a valve 73 for properly adjusting the amount of ammonia in the gases in the pipe 55.

As shown in Fig. 2, instead of passing the aqueous medium coming from the saturator 52 directly to the chamber 33 it may be pumped by means of a pump 74 through a pipe 75 to the sprays 76 in the top of a tower 77 wherein the aqueous medium may be contacted with sulphur dioxide containing gases introduced at the bottom of the tower 77 through a pipe 78.

The aqueous medium which is now preferably in an acid condition and contains an excess of absorbed sulphur dioxide is withdrawn from the bottom of the tower 77 and pumped by means of a pump 79 through a pipe 80 provided with a valve 81 into the chamber 33 above the porous plate 34. In this instance, oxygen containing gases are fed into the chamber 33 beneath the plate 34 through the pipe 82 provided with a valve 83.

At the same time ammonia still gases are introduced into the aqueous medium and the aqueous medium may be retained in the chamber 33 until ammonium bisulphate is formed. Or, if desired, sulphur dioxide may be mixed with the oxygen-containing gases fed through the pipe 82 to control the pH value of the aqueous medium in the chamber 33.

The aqueous medium containing ammonium bisulphate is withdrawn from the chamber 33 and passed to the saturator 52 wherein it is contacted with coal gases containing ammonia to form ammonium sulphate in the manner set forth above with respect to the process conducted in the apparatus shown in Fig. 1. The ammonium sulphate crystals are removed as previously described and the aqueous medium is withdrawn from the saturator 52 into the tank 59 from which it is withdrawn to be again passed through the cycle.

If there is an excess of ammonia in the solution in the saturator 52 the solution may be neutralized by adding the proper amount of sulphuric acid.

The acidity of the solution in the system can be readily controlled so that no bisulphate of ammonia will separate out with the normal sulphate. In other words, the acidity of the solution is controlled so that the solid phase in the saturator includes no acid sulphate but substantially entirely the normal sulphate.

By way of illustration, assuming that a solution of ammonium bisulphate is the equivalent of a solution of ammonium sulphate and sulphuric acid, and assuming that a solution of ammonium sulphate is maintained at a temperature of 30° C., no separation of the acid sulphate takes place when the solution is saturated with 43.6% of ammonium sulphate and contains 10% of acid. If the acid is increased to 13%, or above, the acid sulphate is likely to separate out in the solid phase. My process is best conducted under the conditions mentioned, by maintaining the acid concentration less than about 10%.

In the apparatus shown, the process can be conducted so that about 50% of the ammonia in the coal-gas is condensed in the form of liquor and about 50% remains in the gas. The ammonia from the liquor which is distilled is passed into the chamber 33, and the coal gas containing unremoved ammonia is passed into the saturator 52. In this manner the ammonia is about equally divided between the zone in which the acid sulphate is produced and the zone in which the normal sulphate is produced.

In the normal operation of a coal-gas plant, which operation is preferable in connection with the present process, about one-fourth to one-third of the ammonia in the gas is condensed in the form of liquor. Under these conditions, the apparatus permits of proper adjustment so that, as stated above, the acid sulphate may be formed in one zone and the normal sulphate in a second zone.

By closing the valve 73' (Fig. 1) and opening the valve 73 all of the ammonia from the ammonia still is fed into the gas passing into the saturator 52. In this case, the solution passing out of the saturator should preferably be slightly acid.

The above-mentioned alternative processes may be carried on with or without the presence in the solution passed to the chamber 33, of a catalyst such as a compound of cobalt or manganese. The presence of a catalyst is preferred in the case where no ammonia still gases are passed into the chamber 33. Also, the solution returned to the chamber 33 may or may not be preheated in each instance.

A precaution may be taken to remove hydrogen sulphide and carbon dioxide from the ammonia liquor before passing it to the still 21, by heating it directly or indirectly in a preheater 83 (shown in Fig. 1) which may be of any type. In using the type shown the heated liquor is passed from the preheater into a vent tank 84 and the gases leaving through the pipe 85 may be passed into the gas outlet 57 of the saturator 52. If the preheater is not to be used, the liquor may be by-passed through the pipe 86.

It is particularly desirable to remove the hydrogen sulphide and the carbon dioxide from the ammonia liquor if ammonia still gases are to be passed into the chamber 33. If all of the ammonia still gases are to be passed into the saturator, it is not necessary to remove hydrogen sulphide and carbon dioxide from the ammonia liquor.

A further precaution is to prevent the formation of crystals in the chamber 33. This is readily accomplished by maintaining the solution in chamber 33 in acid condition and at elevated temperatures. If desired, a periodic addition of hot water and/or acid to temporarily dilute the solution in the circulating system may be made in order to prevent a possible clogging up of passages by crystals.

A still further precaution is to provide for the cooling of the solution that is passed into the saturator. A cooler 51' may be employed in the pipe line 51 and the solution may be cooled preferably below 50° C. By this means the size of crystals obtained in the saturator may be controlled to a considerable extent and a satisfactory crystalline structure may be obtained.

In the present process a very satisfactory sulphuric acid equivalent is prepared and it is made possible to produce therefrom ammonium sulphate on a commercial scale at a minimum of cost. In adapting the process to coal-gas plant practice, the equipment ordinarily found in a plant, is utilized as far as possible. An ammonia still, a saturator with ammonium sulphate recovery means, and heat exchangers are available in every plant, so that the only additional equipment needed is apparatus similar to the means 33 shown in the accompanying drawings.

By employing ammonia still gases and by the distribution of ammonia between the ammonia liquor and the coal gas in the manner described, the expense ordinarily involved in evaporating ammonium sulphate solution to produce crystalline sulphate is avoided. In instances where a greater portion of ammonia is left in the gas than is removed by scrubbing, there is an additional saving in steam required to distill the ammonia liquor. If all of the ammonia from the liquor as well as the ammonia in the gas is to be injected into the saturator, the amount of ammonia liquor may be kept down to a minimum.

The invention as hereinbefore set forth is embodied in a particular form but may be variously embodied within the scope of the claims hereinafter made.

I claim as my invention:

1. A process of removing ammonia from fuel gas containing the same comprising, removing part of the ammonia from the gas and forming still gases therewith, contacting the ammonia still gases, sulphur dioxide and oxygen with a body of an aqueous medium in such proportions as to produce ammonium bisulphate solution, removing bisulphate solution from the said body of aqueous medium, and contacting with the bisulphate solution the fuel gas containing the remaining ammonia to form ammonium sulphate, the quantity of ammonia removed from the gas being proportioned to produce that amount of ammonium bisulphate as will remove a predetermined amount of the residual ammonia left in the gas.

2. A process of removing ammonia from fuel gas containing the same comprising, removing part of the ammonia from the gas and forming direct steam distilled ammonia still gases therewith, introducing the ammonia still gases, sulphur dioxide and oxygen into a heated body of an aqueous medium in such proportions as to produce ammonium bisulphate solution in one stage, removing bisulphate solution from the said body of aqueous medium in said stage, and introducing the fuel gas containing the remaining ammonia into the bisulphate solution in a separate stage to form ammonium sulphate, the quantity of ammonia removed from the gas being proportional to that required to produce in the first mentioned stage that amount of ammonium bisulphate as will remove in the second stage the residual ammonia left in the gas, and the amount of ammonia also being in proportion relative to the amount of $SO_2$ and oxygen introduced in the first mentioned stage to maintain the acidity thereof below that at which substantial formation of sulphite or bisulphite will form as an end product in the bisulphate solution in the first mentioned stage.

3. A process of removing ammonia from fuel gas containing the same comprising, removing part of the ammonia from the gas and forming still gases therewith, introducing the ammonia still gases, sulphur dioxide and oxygen into a body of an aqueous medium maintained at a temperature of from substantially 80° C. to the boiling point of the solution formed, and in such proportions as to form ammonium bisulphate, removing bisulphate solution from the said body of aqueous medium, and introducing the fuel gas containing the remaining ammonia into the bisulphate solution to form ammonium sulphate, the quantity of ammonia removed from the gas being proportioned to produce that amount of ammonium bisulphate as will remove a predetermined amount of the residual ammonia left in the gas.

4. A process of removing ammonia from fuel gas containing the same comprising, removing part of the ammonia from the gas and forming still gases therewith, introducing the ammonia still gases, sulphur dioxide and oxygen into a body of an aqueous medium maintained at a temperature of from substantially 80° C. to the boiling point of the solution formed, and in such proportions as to form ammonium bisulphate, removing bisulphate solution from the said body of aqueous medium, introducing the fuel gas containing the remaining ammonia into the bisulphate solution to form ammonium sulphate, separating ammonium sulphate crystals from the solution, and returning the mother liquor to the said aqueous medium, the quantity of ammonia removed from the gas being proportioned to produce that amount of ammonium bisulphate as will remove a predetermined amount of the residual ammonia left in the gas.

5. A method of removing ammonia from fuel gas obtained in the distillation of coal with the formation of ammonium sulphate, comprising scrubbing coal gas with an aqueous medium to remove a portion of the ammonia from the gas, distilling the ammonia liquor formed by such scrubbing directly with steam, introducing the ammonia liquor distillation gases into a liquid medium while introducing sulphur dioxide and oxygen in such proportions as to produce ammonium bisulphate solution, removing the solution thus formed, introducing the coal gas containing the remaining portion of ammonia into the said removed solution in a separate stage, and separating ammonium sulphate from the resulting solution, the quantity of ammonia removed from the gas and reacted to form the bisulphate solution being proportional to that required to produce that amount of ammonium bisulphate as will remove the residual ammonia left in the gas.

6. A method of removing ammonia from fuel gas obtained in the distillation of coal with the formation of ammonium sulphate, comprising scrubbing coal gas with an aqueous medium to remove a portion of the ammonia from the gas, distilling the ammonia liquor formed by such scrubbing directly with steam, introducing the ammonia liquor distillation gases into a liquid medium, while introducing sulphur dioxide and oxygen into the said liquid medium in such proportions as to produce ammonium bisulphate solution, maintaining the liquid at a temperature above 100° C. to prevent condensation therein of steam of the ammonia distillation gases, removing solution containing ammonium bisulphate, and introducing coal gas containing unremoved ammonia into the removed solution containing ammonium bisulphate in a separate stage to form ammonium sulphate, the quantity of ammonia removed from the gas and reacted to form the bisulphate solution being proportional to that required to produce that amount of ammonium bisulphate as will remove the residual ammonia left in the gas, and said amount of ammonia also being in proportion relative to the amount of $SO_2$ and oxygen as to maintain the acidity below that at which substantial formation of sulphite or bisulphite will form as an end product in the bisulphate solution preparation stage.

7. A method of removing ammonia from fuel gas obtained in the distillation of coal with the formation of ammonium sulphate, comprising scrubbing coal gas with an aqueous medium to remove a portion of the ammonia from the gas, distilling the ammonia liquor formed by such scrubbing directly with steam, introducing the ammonia liquor distillation gases into a liquid medium while introducing sulphur dioxide and oxygen into the said liquid medium at such a rate as to maintain it in acid condition and in such proportions as to form ammonium bisulphate, and separately introducing coal gas containing unremoved ammonia into the bisulphate solution to form ammonium sulphate, the quantity of ammonia removed from the gas and reacted to form the bisulphate solution being proportional to that required to produce that amount of ammonium bisulphate as will remove the residual ammonia left in the gas.

8. A method of removing ammonia from fuel gas obtained in the distillation of coal with the formation of ammonium sulphate, comprising scrubbing coal gas with an aqueous medium to remove a portion of the ammonia from the gas, distilling the ammonia liquor formed by such scrubbing directly with steam, contacting a liquid medium in one zone with the ammonia liquor distillation gases, sulphur dioxide and oxygen to absorb the ammonia from the latter gases and in such proportions as to form ammonium bisulphate, contacting the resulting solution in a second zone with the coal gas to absorb the remaining portion of the ammonia and to form ammonium sulphate, the quantity of ammonia removed from the gas and reacted to form the bisulphate solution being proportional to that required to produce that amount of ammonium bisulphate as will remove the residual ammonia left in the gas, and said amount of ammonia also being in proportion relative to the amount of $SO_2$ and oxygen as to maintain the acidity below that at which substantial formation of sulphite or bisulphite will form as an end product in the bisulphate solution preparation stage.

9. A method of removing ammonia from fuel gas by passing the said gas through an aqueous solution of ammonium bisulphate which comprises: treating the fuel gas to remove tar and substantially one-half of the ammonia content, forming ammonium bisulphate with the ammonia so removed by reaction with sulphur dioxide and oxygen in one stage in such proportions as to produce ammonium bisulphate solution and continuously contacting the so treated fuel gas with the bisulphate in another stage, the quantity of ammonia removed from the gas being substantially sufficient to produce enough ammonium bisulphate as will remove the balance of ammonia from the gas.

10. A continuous process as claimed in claim 9 and in which ammonia removed from the gas is steam distilled and at least some of the steam distilled ammonia gases are combined with the fuel gas containing its residual ammonia immediately prior to its being contacted with the bisulphate solution in the second mentioned stage.

11. A continuous process as claimed in claim 9 and in which a catalyst of the character of a compound of cobalt or manganese is present in the first mentioned stage.

FRED DENIG.